Sept. 15, 1953    J. A. OGLE    2,652,326
ART OF MAKING STEREOSCOPIC PICTURES
Filed March 26, 1949    2 Sheets-Sheet 1
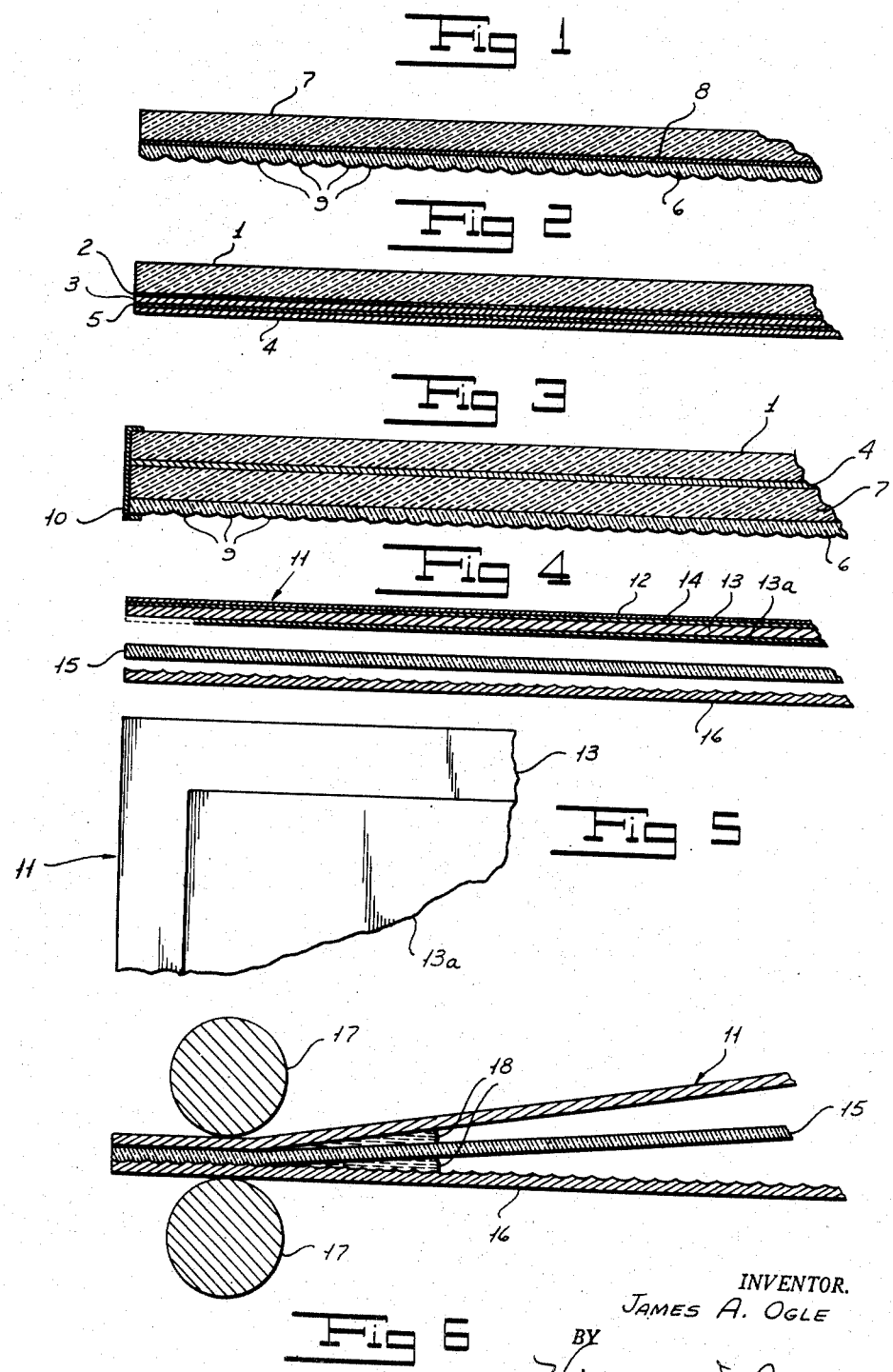
INVENTOR.
JAMES A. OGLE
BY
ATTORNEY

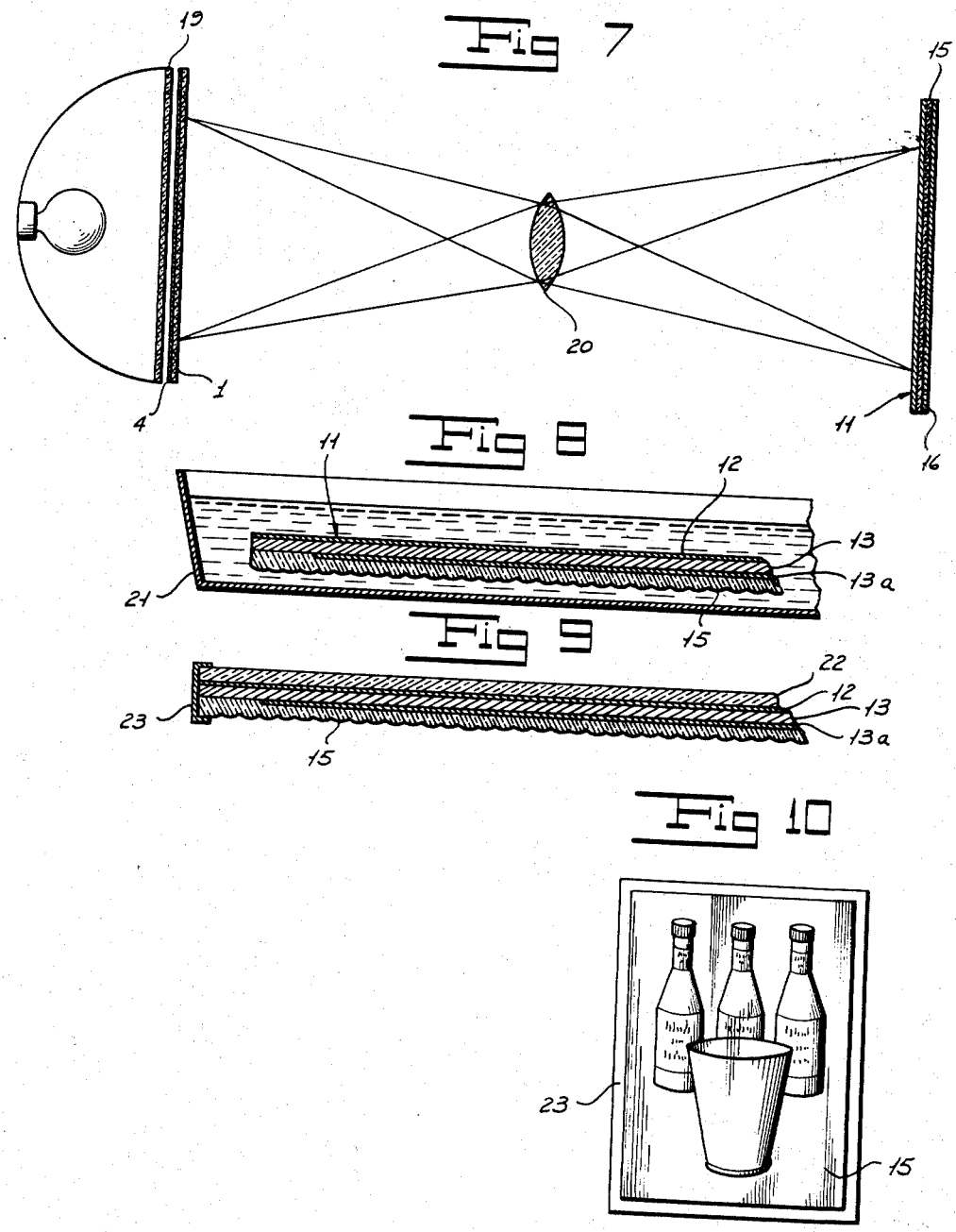

UNITED STATES PATENT OFFICE 2,652,326

ART OF MAKING STEREOSCOPIC PICTURES

James A. Ogle, Phoenixville, Pa., assignor, by direct and mesne assignments, to The Sperry Corporation, a corporation of Delaware Application March 26, 1949, Serial No. 83,726

6 Claims. (Cl. 95—2)

In making stereoscopic pictures by photographic reproduction or printing from an original or master picture, one of the difficult problems has been to obtain proper optical registry of the stereoscopic elements of the reproduction or copy print with the lenticular elements of the viewing screen, and to procure optical agreement between the original and the reproduction in their relations to their respective lenticular screens.

It is an object of this invention to maintain a control in the successive steps of the operation which will assure exact multiple reproductions of the original picture and the obtaining and keeping in the final article the same registry between the screen and picture that there was between the image and the screen in the camera at the time of taking the original picture.

The invention is characterized by an absolute fixation or control of conditions from the initial photographic exposure in the making of the original picture until the exposure for the reproduction is effected, and by maintaining constant thereafter the same relationship between the reproduced picture and its viewing screen, as existed when the exposure for the reproduction was made.

Means are provided in accordance with the invention to hold the dimensions of the master picture fixed so that there can be no change in the spatial relation of the component stereoscopic elements of the picture. That picture, which is thus restrained from physical change, is, when used for reproduction, caused to form an image, either by contact printing or by projection printing, upon a print or copy film which is fixed or bonded to a viewing screen having similar lenticulations to those of the photographic screen, preferably the same lenticulations. Thus the picture is exactly reproduced in the proper or desired proportions. In the case of contact printing the proportions will be the same, while in projection printing the proportions may be controlled.

The invention contemplates as its method the making of an original photographic transparency which is a composite of successive stereoscopic elements obtained by progressive exposures at constantly changing angles produced by so-called scanning, that is, relative movement of the camera and object across the photographic field, the image elements at each instant position being produced by a lenticular screen, preferably one having cylindrical lenticulations so that the elements are lines. When the picture is developed and is viewed through a lenticular screen such as was used for making the stereoscopic image, the angle subtended by the pupillary distance of the observer will determine the two sets of steroscopic elements which each eye sees, and a composite of the respective sets produces an image upon the respective eyes, the two images differing in angular projection by the subtended angle aforesaid. It is the mental resolution of these two images which produces the three dimensional effect.

For accurate and dependable unlimited reproduction of this original picture, it is essential (1) that the original be absolutely stable in form and dimensions, and (2) that the copy print be made with a definite relationship to a viewing screen and that that relationship be kept.

With these ends in view, the invention further contemplates that each copy film will be bonded to a viewing screen which may be and preferably will be a precise duplicate of the photographic screen used in the original exposure, and the master picture is caused to produce an image of itself upon the sensitized gelatin of the copy film which is then developed while bonded to the viewing screen. Any dimensional changes in the print are partaken of also by the screen, since the two are fixedly bonded together, and the visual characteristics are therefore unaffected by dimensional changes.

It is this developed picture permanently fixed on the back of a screen member which constitutes the final print, although customarily a diffusing screen is added to avoid undesirable specular interference, being laid loosely upon the emulsion side and the assembly being secured together by suitable means, such as an edge binding tape.

The screen members are composed of a suitable transparent plastic, such as cellulose acetate, which is capable of being molded when cold and is dimensionally sufficiently stable for the purpose. Since the photographic lenticular screen and the original picture are used repeatedly, it is the practice to mount both of them upon a glass backing member, the lenticulations of the screen being formed, as by hydraulic pressure, after the plastic is attached to the plate so as to assure permanency in the lenticulations as they are formed, and the photographic film for the original picture being mounted upon its glass backing member before exposure and developing, thus making a photographic plate of permanent size and shape.

Preferably a color film is used, and since the pictures are reproduced and viewed by transmitted light, it is necessary that their transparency be unimpaired. For this reason the antihalation layer in the film which is opaque, must be removed in the developing and fixing. Since this method involves the permanent bonding of the acetate base of the unexposed film to the glass in case of the original and to the acetate screen in case of the copies, it is necessary that the antihalation layer be in front of the acetate base so that the liquors have access to it.

The method and the product produced thereby will now be more fully explained in connection with the accompanying drawings, in which:

Fig. 1 is a sectional view of the photographic screen assembly used in making the original stereoscopic picture, this view and most of the following views being diagrammatic in that they are dimensionally distorted to illustrate principles.

Fig. 2 is a similar view of the original color film assembly.

Fig. 3 is a combination view of the parts shown in Figs. 1 and 2 assembled in a plate holder and as mounted in a camera.

Fig. 4 is an exploded sectional view of the elements which make up the copy unit.

Fig. 5 is a fragmentary view of a corner of the copy film which is shown in section in Fig. 4.

Fig. 6 is a diagrammatic showing of the apparatus and method employed in making the copy unit.

Fig. 7 is a sectional diagrammatic showing of the operation of printing by photographic projection.

Fig. 8 is a sectional illustration showing the copy unit in the developing liquor.

Fig. 9 is an enlarged fragmentary section of the final product.

Fig. 10 is a face view of the final product containing an illustrative three dimensional picture.

The original photograph, according to the particular steps and apparatus contemplated in the illustrated embodiment of the invention, is taken upon a glass mounted color film as shown separately in Fig. 2 and in combination with its screen in Fig. 3. The film is cemented to the glass mount 1 by a layer 2 of suitable cement, such as Casco cement, the film acetate base 3 being toward the glass and the sensitized emulsion 4 being on the outer side. Between the emulsion and the acetate base is the antihalation layer 5, which, as above explained, is removed during the developing. Also ordinarily there is an anti-curl layer on the back of the acetate base which constitutes the cemented surface. The anti-curl layer is not shown in these figures. It will be understood that the dimensions are shown disproportionately for the purpose of illustration.

In the camera this photographic plate assembly is combined with a lenticulated screen such as shown in Fig. 1. This consists of a sheet 6 of cellulose acetate which is permanently attached to a glass back 7 by a suitable adhesive 8, such as gelatin and glacial acetic acid. The outer face of the acetate sheet is formed into very fine contiguous, substantially semicylindrical convolutions 9 constituting lenses and making the sheet into a lineating screen. In the actual screen the lenticulations 9 are much finer than those shown, being as many as sixty or more to the inch. They may be formed after the mounting upon the glass, as in a hydraulic press, thus assuring their dimensional and geometrical permanency.

To make the photograph, the photographic plate and the screen above described are mounted in contiguous relation in the camera in a plate holder 10, as shown in Fig. 3, with the emulsion side of the plate and the lenticular side of the screen toward the camera lens. The distance of the plate holder from the lens is such that the image of the object being photographed is brought to a focus on the emulsion 4, there being the double refraction of the camera lens and of the screen lenses. Because of the latter refraction the image is resolved into a series of fine lines which constitute the stereoscopic elements of the picture. The camera is relatively traversed in front of the object at right angles to the lenticulations, so that the effect is a succession of instant positional exposures with linear components of the image moving laterally on the film reversely to the direction of relative movement of the camera. When the developed picture is viewed through a screen like the photographic screen, the set of lines constituting the stereoscopic elements for any instant position of the camera, collectively constitute the monocular pictorial representation of the object when viewed from the same relative position that the camera lens had in forming that image, for the path of the rays is the same in either direction through the screen.

When the composite of those stereoscopic elements is forming an image upon the retina of one eye of the observer, another image is formed upon the retina of the other eye by the composite of the lines that were exposed when the camera lens and plate had relatively moved the pupillary or interocular distance. In other words, the two images have a difference in angularity corresponding to the angle subtended by the pupillary distance at the point of viewing, and thus a stereoscopic effect is produced.

It will be understood that after exposure the plate is taken out from the plate holder and developed in the usual way, but without affecting the bonding to the glass back. Thus dimensions of the picture are held fixed and identity of prints is thereby assured. The original picture thus formed is used as a transparency in reproduction, the antihalation layer being removed, as above stated, due to the fact that it is in front of the acetate base and the developing liquids have access to it.

As above indicated, the original picture may be checked after finishing by viewing it through the original screen or a duplicate thereof, and the assembly of Fig. 3 may be considered as for that purpose as well as for the purpose of photographing, depending upon whether the picture is actual or potential.

The construction of the copy or reproduction unit will now be considered, with particular reference to Figs. 4, 5 and 6. Initially and during the printing stage, this unit consists of three laminated elements, namely, the photographic color film, the acetate screen and a metal die which molds the lenticulations in the screen. These elements are shown in their separated states in Fig. 4. The film 11, as in the original picture, has its emulsion 12 backed by an acetate base 13 with the antihalation layer 14 between them. On the back of the acetate base 13 is an anti-curl layer 13a. The film is disposed upon an acetate sheet 15 which in turn is laid upon a metal die 16, for example, chromium plated copper, having mold configurations in its face which are the complement or reverse of the lenticulations 9 in the photographic screen.

These elements are united to form a laminated unit and the lenticulations are formed at the same time in the outer face of the acetate sheet 15 by passing the elements between pressure rolls 17, as indicated schematically in Fig. 6. The film has its anti-curl side toward the screen member 15, and for effective bonding purposes a marginal portion of the anti-curl back 13a is removed, as shown in Fig. 5 and as indicated by broken lines in Fig. 4. Thus in that marginal area the acetate base is exposed and is brought into direct contact with the contiguous face of the acetate 15.

Just as the three elements enter the bite of the rolls 17, a puddle 18 of a suitable solvent, such as acetone, is introduced on both sides of the sheet 15. In practice an apparatus, not shown, is used which is power operated and controlled by a pedal, the operation through the successive steps being automatically continuous. First the three elements in their laminated relation are moved up to the bite of the rolls where momentarily they are stopped. At that instant two solenoid operated valves open and deliver acetone through tubes leading to the intervening spaces immediately above and below the sheet 15. After a suitable interval the mechanism resumes operation and the elements are passed between the rollers. The acetone softens the superficial areas of the acetate 15 and the pressure of the rollers effects molecular union between the acetate base 13 where it is exposed in the marginal region of the film 11 and the contiguous surface of the acetate 15, and optical contact between the anti-curl back 13a of the film and the acetate 15, thereby permanently bonding the film to the acetate sheet with the emulsion side of the film outward.

At the same time the acetone somewhat softens the face of the acetate sheet contiguous to the die and under the pressure of the rolls the configurations of the die are molded into the face of the acetate, thus converting the acetate into a viewing screen. The die and screen are frictionally bonded and ordinarily the film-screen combination is not stripped from the die until after the printing of the picture.

While this film-screen-die combination package is adapted and is ordinarily used for making copies or prints from a master picture, in which application it is further illustrated and will be described, it is capable of use as the basis for an original picture where reproduction or multiplication of copies is not desired. For this purpose it is used in the plate holder of the camera in place of the glass plate assembly shown in Figs. 2 and 3. The exposure is made through the photographic screen of Fig. 1, proper registry having been made, just as in Fig. 3, and the film is then developed, the antihalation layer being removed during the developing, the screen, with the stereoscopic picture permanently upon it being stripped from the die before developing. The screen then becomes the viewing screen and at the proper viewing distance, which is substantially the focal distance of the camera lens, the picture as viewed through the screen has depth perception or a stereoscopic effect. So long as the die is attached, the screen with its bonded picture is rigidly held against dimensional change, and thereafter the relative relationship of the screen and picture is unchangeable.

When, as is more usual, the color film and viewing screen combination is used for the making of a reproduction of the master picture, the printing operation is performed by any suitable photographic printing method, contact or projection.

As shown in Fig. 7, the master picture is mounted in the projecting end of a photographic projection printer with a diffusing glass 19 and a source of light immediately behind it, while the copy film unit is mounted at the printing end on the opposite side of the projection lens 20. The position of the copy unit relative to the original or master picture is determined by pads and gauges on which the copy unit is placed and which have been carefully preset to bring the stereoscopic elements of the original picture into the same optical relation to the lenticulations of the screen 15 that they had to those of the screen 6. A photographic image of the original picture is thus projected upon the emulsion 12, after which exposure the film and screen are stripped from the copper die 16, and the picture is chemically developed, which operation is indicated by Fig. 8 in which the exposed film and acetate screen are shown in developer liquor in a pan 21.

When developed and dried, the print with the viewing screen attached becomes the final product. As a commercial article the package is customarily completed by the addition of an opalescent acetate diffusion sheet 22 which is laid on the emulsion side of the article and is secured by a binding tape 23.

This final product or package is shown in Figs. 9 and 10. In Fig. 10 a picture is represented the subject of which has the third dimension. A monocular vision of the picture is all that is represented in this figure, but it will be understood that with the picture composed of steroscopic lineated elements and viewed at the proper distance through the screen 15, the third dimension becomes apparent, and as the angle of vision changes by relative lateral movement of the picture, the angle of projection of the bottles in the background relative to the tumbler in the foreground changes accordingly, while maintaining the stereoscopic effect. In other words, there will at all times be two sets of linear elements of the photograph which were taken at an angle to each other corresponding to the angle subtended by the pupillary distance of the observer at the proper viewing distance.

It will be obvious that the essentials of the method above explained may be adapted and applied in many ways other than those particularly described and as illustrated in the drawings, without departing from the scope of the invention as defined in the following claims.

What is claimed is:

1. A method of making a stereoscopic picture comprising disposing a sheet of moldable transparent plastic upon a flat die having cylindrical lenticular cavities in its contiguous face, disposing a photographic film upon the plastic with its emulsion side exposed, introducing a solvent on both sides of the plastic, passing the members in said relation between pressure rollers and thereby bonding the film to the plastic and molding lenticulations in the other face of the plastic, thereby converting it into a lenticular screen, disposing a transparent stereoscopic picture in the projection end of a photographic projection printer, disposing the bonded film and screen with the die adhering to the screen in the printing end of said projection printer with the film toward the lens in proper spatial and lateral relation to the image of said transparent stereoscopic picture, projecting said image of the picture upon the film, stripping the die from the screen, and then developing the film in its bonded relation to the screen.

2. The method of making a stereoscopic picture comprising pressing a sheet of moldable transparent plastic upon a flat die the surface of which has cylindrical lenticular concavities and causing the contiguous face of the plastic sheet to conform and adhere to the die face, thereby converting the plastic sheet into a lenticulated viewing screen, disposing and bonding a photographic film upon the opposite face of the plastic sheet with its emulsion side out, photographically producing a stereoscopic image upon the emulsion side of the film while the die is adhering to the viewing screen, then stripping the die from the screen, and then developing the film in its bonded relation to the screen.

3. The method of making a stereoscopic picture comprising bringing a sheet of transparent plastic into face contact with a die and pressure molding lenticular lineations from the die into the contiguous face of the sheet, photographically sensitizing the opposite face of the sheet, and photographically exposing the sensitized face to a stereoscopic image while the die and sheet are engaged and the lenticular lineations are stabilized.

4. A color photography method of obtaining accurate reproductions of color stereoscopic pictures comprising photographing an object through a lineated lenticular photographic screen upon a dimensionally stabilized color film, pressing a sheet of transparent plastic against the face of a die and molding into the contiguous face of the sheet a replica of the lineated lenticulations of the said photographic screen and thereby forming a viewing screen optically matching the photographic screen, bonding a color photographic film to the opposite face of the viewing screen, photographically projecting the stereoscopic image on the first mentioned color film upon the second mentioned color film with the lineations of the image in registry with the lenticulations on the viewing screen and with the viewing screen in engagement with and dimensionally stabilized by the die, then stripping the die from the viewing screen and developing the second mentioned color film in its bonded relation to the viewing screen.

5. The method of making a stereoscopic picture comprising bringing a sheet of transparent plastic into face contact with a die and pressure molding lenticular lineations from the die into the contiguous face of the sheet and utilizing said contact to maintain dimensional stability of the sheet, photographically sensitizing the opposite face of the sheet, photographically exposing the sensitized face to a lineated stereoscopic image the lineations of which spatially conform to and register with the lineations molded in the face of the said sheet and during conditions of said dimensional stability of said sheet, and photographically developing said image, said die being maintained in contact with the sheet until after the said exposure and being separated from the sheet before the developing of the image.

6. The method of making a stereoscopic color transparency comprising temporarily softening both faces of a sheet of transparent plastic, disposing a photographic color film against one softened face with the emulsion side out, disposing against the opposite softened face a die the surface of which has closely spaced cylindrical concavities, squeezing the three members together and thereby bonding the color film to its face of the sheet and causing the opposite face of the sheet to conform to the contiguous die face and be converted into a lenticulated viewing screen and to have frictional engagement with the die and be dimensionally stabilized thereby, photographically producing a color stereoscopic image upon the emulsion side of the color film during conditions of said dimensional stability of the sheet, and then developing the color film in its bonded relation to the lenticular sheet, said die being maintained in contact with the sheet until after the production of said image upon the color film and being then separated from the sheet before the development of the film.

JAMES A. OGLE.

References Cited in the file of this patent

UNITED STATES PATENTS

| Number | Name | Date |
|---|---|---|
| 289,242 | Edson | Nov. 27, 1883 |
| 761,679 | Ives | June 7, 1904 |
| 1,128,979 | Hess | Feb. 16, 1915 |
| 1,214,552 | Keller-Dorian | Feb. 6, 1917 |
| 1,918,705 | Ives | July 18, 1933 |
| 2,151,301 | Percy | Mar. 21, 1939 |
| 2,177,417 | Eggert | Oct. 24, 1939 |
| 2,219,158 | Van Benschoten | Oct. 22, 1940 |
| 2,297,846 | Van Benschoten | Oct. 6, 1942 |
| 2,418,303 | Hutchison | Apr. 1, 1947 |
| 2,418,304 | Hutchison | Apr. 1, 1947 |